Patented July 21, 1953

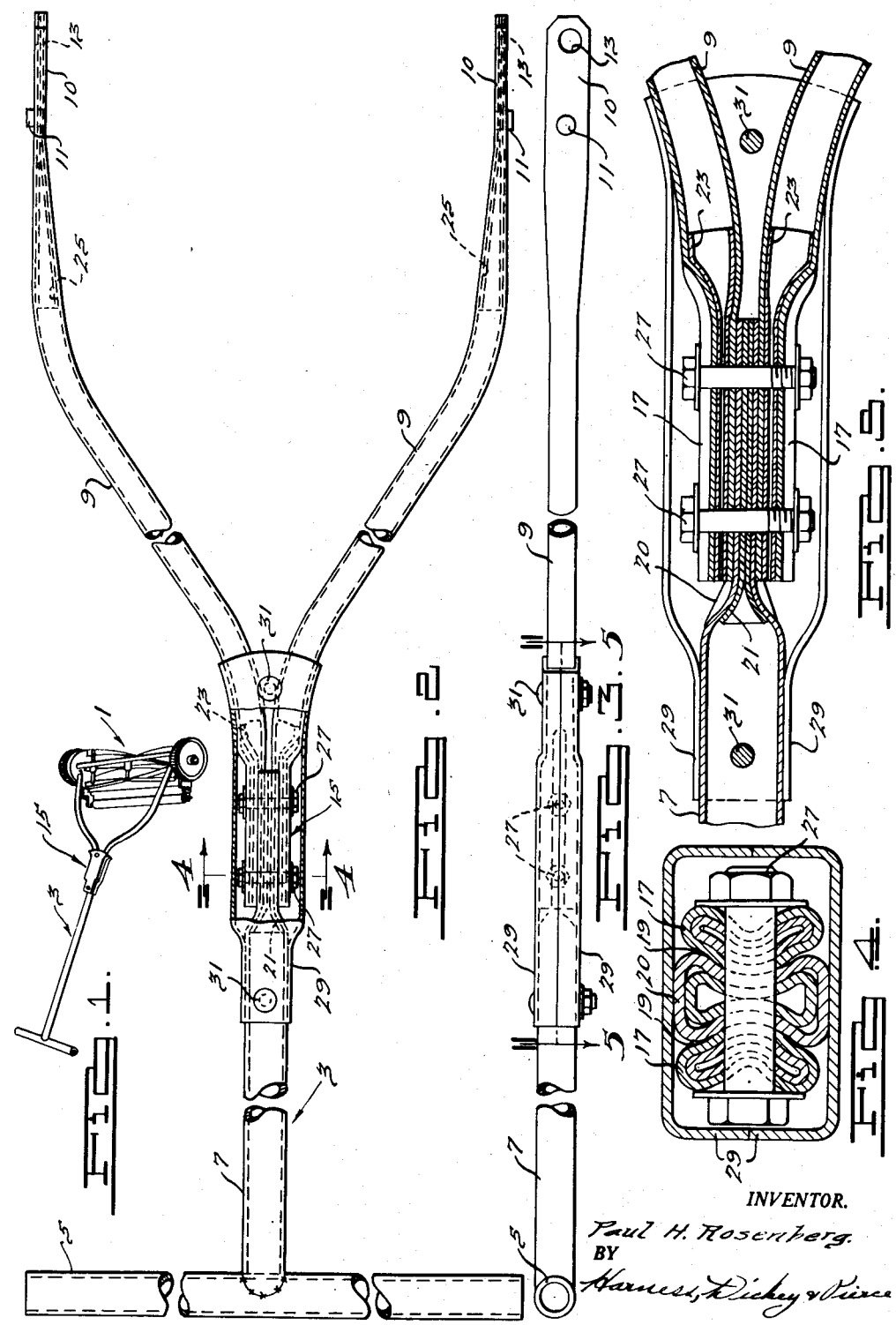

2,645,808

UNITED STATES PATENT OFFICE 2,645,808

SECTIONAL LAWN MOWER HANDLE

Paul H. Rosenberg, Lansing, Mich., assignor to Reo Motors, Inc., Lansing, Mich., a corporation of Michigan Application March 10, 1949, Serial No. 80,633

6 Claims. (Cl. 16—111)

This invention relates to lawn mowers and, in particular, refers to lawn mower handle constructions.

It is an object of the invention to provide a lightweight lawn mower handle which is durable and strong, and also easy to manufacture.

Another object is to provide a lawn mower handle which may be readily separated into a plurality of parts so that it may be packaged for shipping purposes.

A further object is to provide a separable lawn mower handle of tubular construction wherein the shank and shank extensions may be interconnected in a joint of minimum width and maximum resistance to relative pivotal movement.

Another object is to provide a separable lawn mower handle of pleasing and streamlined appearance and in which the junction of the separable elements is covered in an attractive manner.

By way of illustration, the features of construction for accomplishing these and other objects of the invention are shown in preferred form in the lawn mower handle of the accompanying drawing in which:

Figure 1 is a perspective view of the improved handle assembled with the cutting mechanism;

Fig. 2 is plan view of the handle assembly;

Fig. 3 is a side elevation of the handle assembly;

Fig. 4 is a section taken on line 4—4 of Fig. 2; and,

Fig. 5 is a section taken on line 5—5 of Fig. 3.

The lawn mower generally indicated in Fig. 1 by the reference numeral 1 has a separable handle assembly generally indicated by the reference numeral 3 which is constructed in accordance with the principles of this invention. As shown best in Figs. 2 to 5, the handle assembly 3 comprises a T-head section which includes a lateral push bar 5 which may be welded to a shank 7 and a pair of laterally spaced generally Z-shaped shank extensions 9 which are adapted by means of studs 11 and recesses 13 at their extreme end portions 10 to be removably but fixedly secured to the frame of the cutter mechanism in the conventional manner. The members just described are for the sake of lightness and strength preferably constructed from metal tubing. In accordance with the load distribution, the shank 7 may be of larger O. D. than the shank extensions 9, ⅞ and ⅝ inch diameter, respectively, being preferable.

The handle shank 7 and the shank extensions 9 are connected together at a central point of the handle assembly 3 as shown at 15. In order to provide, in effect, a keyed connection between these members so as to prevent relative twisting, the contacting ends thereof are preferably formed in the novel manner which is best indicated in Fig. 4. In this construction, the originally tubular ends 17 of the shanks 9 are crushed or deformed by suitable means into trough-shaped tabs so that in cross section they become generally biconvex and thus present mutually facing bulges or protuberances 19. The originally tubular end of the handle shank 7 is formed to receive and mate with the bulges 19 and for this purpose is made doubly concave as shown at 20 in the drawing. In order to reinforce and strengthen the connected ends of the shank extensions and the handle shank, originally tubular liners may be inserted therein and deformed therewith to the shapes just described. Thus, the handle shank 7 has the liner 21 and the shank extensions 9 have the liners 23. If desired, the extreme ends 10 of the shank extensions 9 which are connected to the cutter mechanism frame may also be reinforced by means of liners 25. The mutually contacting ends of the extensions 9 and the handle 7 are held in keyed relation by a pair of bolts and nuts extending therethrough and shown at 27.

Before the shanks 9 and the handle 7 are interconnected by the bolts 27, the mutually engaging convex and concave faces shown at 19 may or may not, depending upon the extent of production variations, fit closely to each other, when the bolts 27 are tightened, however, the handle 7 and particularly the shanks 9 are deformed and pressed together so that there is no looseness in the joint. Preferably, the shank bulges are somewhat more curved than the concave portion of the handle. Thus, when pressure is applied the curvature tends to decrease, as the opposite sides of the shanks are spread apart, and the shanks are deformed to conform to the handle and thus hold these members tightly together.

A split cover plate assembly may be placed over the connection or junction 15 of the separable elements and this includes identical upper and lower plates 29, the top ends of which are reduced in width to fit the outer periphery of the shank 7 and the lower ends of which are flared outwardly to conform to the inclined portion of the shank extensions 9. The upper and lower plates may be interconnected by means of bolts and nuts 31.

It will be observed that the head or assembly 3 just described, though rugged and durable of construction, is nevertheless light in weight. The novel connection 15 may be cheaply formed by suitable press operations, but nevertheless functions to provide a positive and rigid connection between the shank extensions and the handle so that twisting and pivoting of these members cannot occur. This connection is such that it easily accommodates differences in the diameters of the shank and shank extensions. Furthermore it is covered and protected in a pleasing manner by the plates 39 so that the handle as a whole presents an attractive, streamlined appearance. Nevertheless, the handle assembly is easily separable so that the operative length of the handle may be reduced at least in half upon simple removal of the bolts 31 and 27, whereupon the members may be disjointed and compactly stored in the usual containers that are provided for shipment of the cutter mechanism. Such disassembly greatly facilitates transportation of the lawn mower by decreasing its bulk and decreasing the possibility of injury to the handle.

It will be appreciated that the invention is not specifically limited to the construction shown, but that various modifications may be made therein within the spirit and scope of the invention.

What is claimed is:

1. In a lawn mower having a handle shank member and a pair of shank extension members, means for removably connecting an extension member to the shank member, said means including an elongated arcuately surfaced protuberance on one of the members and an elongated arcuately surfaced recess on the other member receiving the arcuate surface of said protuberance, the arcuate surfaces of said protuberance and recess being of different curvatures but said protuberance being deformable upon application of pressure to conform the curvature of its surface to that of the recess, and means for pressing the protuberance and recess surfaces together to deform the protuberance to conform to the recess whereby said members are connected together to inhibit relative rotation.

2. In a lawn mower or the like having a tubular handle shank and a pair of tubular shank extensions, a connection between the shank and pair of extensions comprising an end portion on the shank having curved side surfaces, end portions on the extensions having surfaces contacting said side surfaces and of a different normal curvature than said side surfaces, and means extending transversely of said end portions and clamping them together and deforming at least certain of the end portions so that the contacting surfaces have substantially the same curvature.

3. In a lawn mower or the like having a tubular handle shank and a pair of tubular shank extensions on opposite sides of the shank with the shank between them, a connection between the shank and a pair of extensions comprising an end portion of said tubular shank being deformed into a doubly concave shape presenting concave side surfaces, end portions of said tubular extensions having operative convex surfaces engaging the concave side surfaces of said shank, means clamping the end portions together, said end portions of the tubular extensions being deformed into shapes having said convex surfaces and also concave surfaces, both said convex and concave surfaces on each end portion being offset from the axis of the extension and on the same side of said axis.

4. The invention set forth in claim 3 wherein said convex surfaces are of normally smaller radius of curvature than said concave side surfaces but said clamping means deforms them so that in assembly they have substantially the same radius of curvature.

5. The invention set forth in claim 4 wherein said clamping means comprises a bolt and a nut threaded thereon and said tubular extensions are formed of metal.

6. A joint for two longitudinally disposed adjoining tubular sections comprising; each of said sections having a tab, both of said tabs being trough-shaped longitudinally and residing in nested relationship with each other, said tabs when unstressed being of different curvatures, and means for detachably clamping said tabs together in nested relationship, said means acting to deform at least one of the tabs so that when assembled both tabs have substantially the same curvature.

PAUL H. ROSENBERG.

References Cited in the file of this patent

UNITED STATES PATENTS

| Number | Name | Date |
|---|---|---|
| 1,270,463 | Tonolli | June 25, 1918 |
| 1,317,386 | Pearl | Sept. 30, 1919 |
| 1,858,618 | Carlson | May 17, 1932 |
| 2,123,813 | Stiles | July 12, 1938 |
| 2,313,139 | Funk | Mar. 9, 1943 |
| 2,511,160 | Grobowski | June 13, 1950 |